March 29, 1960  E. E. SCHNELL  2,930,629
IMPLEMENT SUPPORT

Filed Sept. 15, 1955  2 Sheets-Sheet 1

INVENTOR
ERNST E. SCHNELL
BY
Roger C. Johnson
ATTORNEYS

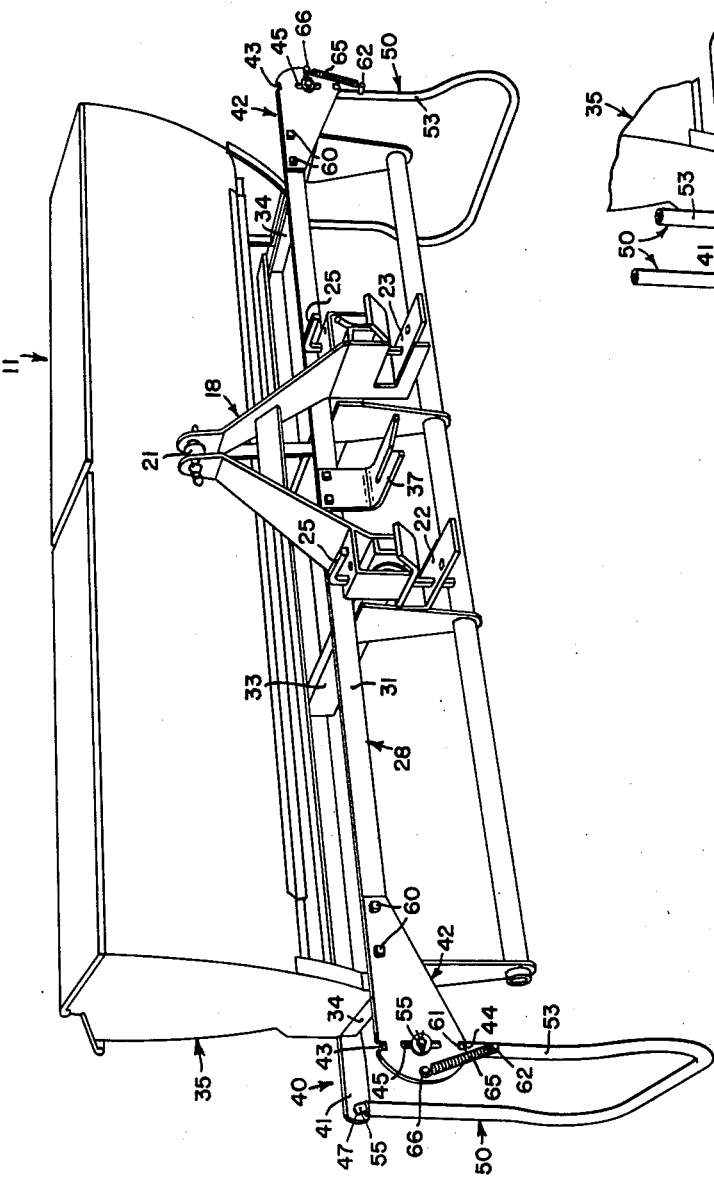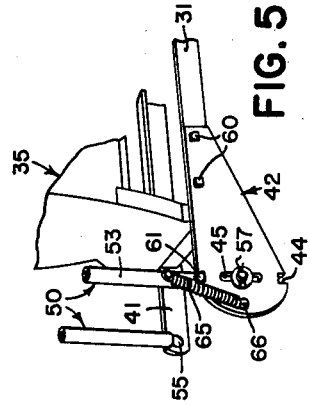

United States Patent Office 2,930,629
Patented Mar. 29, 1960

2,930,629
IMPLEMENT SUPPORT

Ernst E. Schnell, West Bend, Wis., assignor, by mesne assignments, to Deere & Company, a corporation of Delaware Application September 15, 1955, Serial No. 534,574

1 Claim. (Cl. 280—150.5)

The present invention relates generally to agricultural implements and more particularly to implements of the type that are adapted to be carried on the hitch links of a farm tractor having means by which the hitch links may be raised and lowered by power for the purpose of raising and lowering the implement, as into and out of transport and working positions.

The object and general nature of the present invention is the provision of a grain drill of the tractor-carried type in which, as will be described in detail below, means is provided for supporting the grain drill when it is detached from the tractor, which means is adapted to be swung upwardly into a transport position when the grain drill is attached to the tractor and propelled thereby in operating or transport positions.

More specifically, it is a feature of this invention to provide movable support means for a grain drill of the integral or tractor-carried type, in which the support may include a pair of swingably mounted parts, with means for locking the parts optionally in either a drill-supporting position, in which case the locking means prevents any undesired movement of the supporting structure, or in a transport or working position, with no likelihood of the swingably mounted parts accidentally falling to the ground and interfering with the operation and/or transport of the drill.

These and other objects and advantages of the present invention will be apparent to those skilled in the art after a consideration of the following detailed description, taken in conjunction with the accompanying drawings, in which:

Fig. 4 is a perspective view showing the grain drill at its supporting means in the positions they occupy when the grain drill has been separated from the tractor.

Fig. 5 is a fragmentary perspective detail view, showing the action of the locking means in holding the supporting struts in their elevated position.

Figure 1:
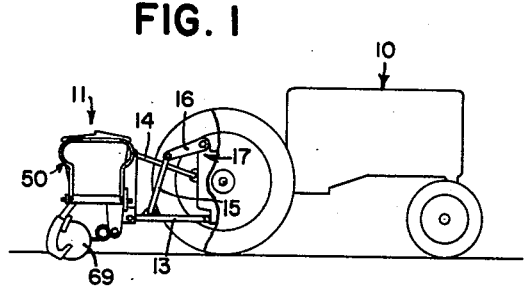
Fig. 1 is a side view of a tractor and tractor-carried grain drill, showing the various parts in the operating or working position, in which the grain drill supporting means has been swung upwardly into an inoperative position.
Figure 2:
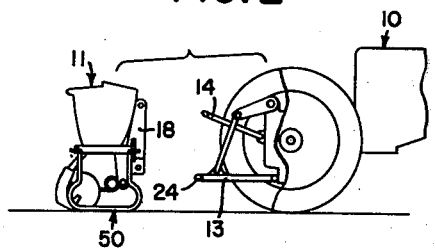
Fig. 2 is a view similar to Fig. 1 but with the grain drill separated from the tractor and supported on its own struts or supporting bails.

Referring first to Figs. 1 and 2, the tractor is indicated in its entirety by the reference numeral 10 and the grain drill is indicated in its entirety by the reference numeral 11, the tractor having a pair of lower hitch links 13 and an upper link 14, forming the principal portions of the well-known three-point hitch arrangement in fairly common use at the present time. The lower links 13 are connected by lift links 15 to a pair of lift arms 16 that form a part of the power lift system 17 of the tractor whereby at the option of the operator the hitch means may be raised and lowered, as desired, to provide for raising and lowering the implement associated therewith. Also, the rear ends of the links 13 and 14 are adapted to be releasably connected as by any suitable means, with a hitch structure 18 that forms a part of the grain drill 11 and which is especially formed to receive the hitch links of the tractor. Briefly, as indicated in Fig. 4, the implement hitch structure includes a frame work providing an upper hitch point 21 and a pair of laterally spaced apart hitch points 22 and 23 by which draft transmitting means, such as a crossbar 24 carried by the draft links 13 of the tractor, may be detachably connected with the implement 11, as by draft transmitting pins 25 releasably carried in the implement hitch structure 18. The hitch structure 18 forms a part of the main transversely extending frame 28 of the grain drill, which main frame structure comprises front and rear transversely disposed frame bars 31 and 32 and associated intermediate end bars 33 and 34. The transverse frame 28 forms means carrying the hopper or seed box 35 of the implement 11. The front bar 31 carries a suitable guide 37 that aids in bringing the interconnecting hitch parts together in the proper relation when the tractor is backed into the implement for the purpose of connecting the implement to the tractor, and in this latter operation, the rear end of the upper link 14 is connected to the hitch point 21 by any suitable means.

Figure 3:
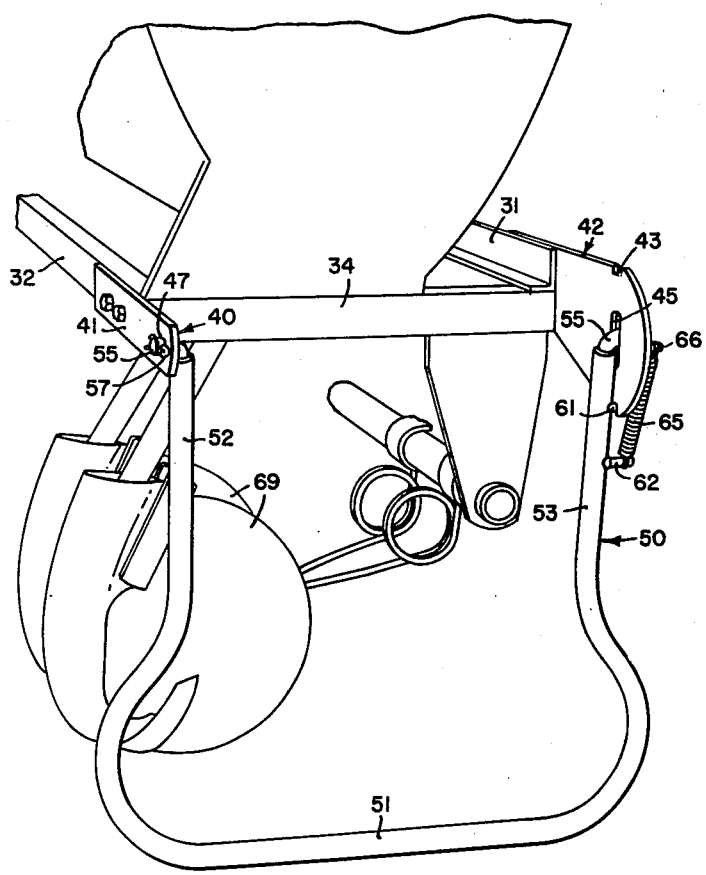
Fig. 3 is an enlarged fragmentary perspective view showing in detail the drill-supporting means in its supporting position.

The present invention is particularly concerned with a swingable drill-supporting means by which the grain drill is supported on the ground or floor whenever it is separated from the tractor on which the drill is normally supported when in operation. To this end, a pair of bracket means, each indicated by the reference numeral 40, is fixed to each end of the transverse drill frame 28. Each bracket means 40 includes a rear outwardly extending bracket member 41 and a forward outwardly extending bracket member 42, the latter being in the form of a generally vertically extending plate member having upper and lower notches 43 and 44 and a generally vertical slot 45 disposed generally centrally of the laterally outer portion of each of the brackets 42. The outer end of the rear bracket 41 is apertured, as at 47, Fig. 3, and a suitable supporting member 50 is swingably connected with the grain drill frame 28 at each end of the latter through the brackets 41 and 42 just described. As will best be seen in Fig. 3, each of the supporting members 50 is in the form of a generally U-shaped part having a central section 51 and end sections 52 and 53, the upper portions of which are formed by outwardly extending right angle pivot members 55, the outwardly extending portions of which extend through the aperture 47 in the bracket 41 and the slot 45 in the bracket 42. The outer portion of each of the end sections 55 is apertured to receive a retaining member 57, whereby the supporting member 50 at each end of the grain drill is held in pivotal relation therewith, it being noted that by virtue of the slot 45, the forward end section 55 may move upwardly and downwardly in the slot 55 through a limited extent. This entails some rocking of the rear pivot member 55 in the aperture 47 in a generally fore and aft extending plane, but the fit of the pivot 55 in the aperture 47 is sufficiently loose to accommodate such rocking movement when the other pivot member 55 moves generally vertically in the slot 45. The brackets 42 are bolted to the end portions of the grain drill frame angle 31 by bolts 60, as will be seen from Fig. 4.

Suitable locking means is provided for releasably retaining the supporting structure bail 50 in either the lower position, Fig. 4, or in the upper position, Fig. 1. A projection 61 is secured, as by welding, to the forward end portion 53 of each bail 50, and below the projection 61 a spring-receiving projection 62 is provided, as best shown in Fig. 4. A spring 65 is fixed at its lower end to each projection 62 and at its upper end is connected to a projection 66 that is fixed to the outer end of each of the plate brackets 42. The spring 65 functions to hold the associated projection 61 in either of the associated notches 43 and 44.

In operation, when it is desired to disconnect the tractor 10 from the implement 11, as shown in Fig. 1, the implement is first raised upwardly out of contact with the ground, the implement 11 being raised to a sufficient extent to carry the furrow openers 69 also out of engagement with the ground. As shown in Figs. 1 and 5, when in use and when the grain drill 11 is supported on the tractor through the associated hitch structure, the supporting struts 50 are swung upwardly in an inoperative position adjacent each end of the seed hopper 35. In this position of the members 50, each is held by the associated locking means against becoming displaced out of position by the action of the spring 65, plus the weight of the strut member 50 itself, acting to hold the projection 61 in the notch 43. Therefore, when the operator reaches the place where the grain drill is to be left, the operator will manually raise the forward part 53 of each of the strut members 50 until the associated abutments 61 are released from the notches 43. Then each supporting strut 50 may be swung downwardly into a position in which the projections 61 now enter the lower notches 44, the springs 65 having sufficient strength to overcome the weight of the strut members 50 and thus hold the projections 61 in the notches 44. With the strut members thus securely held against displacement laterally, the operator then actuates the power lift mechanism 17 and lowers the implement until the central portions 51 of the struts 50 rest upon the ground or floor. The weight of the grain drill then cooperates with springs 65 to insure that the strut members 50 are held in a vertical position by virtue of the projections 61 being securely maintained in the associated notches 44 of the plate brackets 42.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

In a tractor mounted implement adapted to be raised off the ground and lowered to the ground by power lift means on the tractor, the improvement comprising a transverse frame having front and rear transverse frame members, a pair of apertured bracket members at each end of said frame, means fixing the bracket members of each pair to the outer end portions of the associated front and rear transverse frame members, a generally U-shaped supporting stand at each end of said frame, each supporting stand including a first leg section and a second leg section, one bracket member of each pair being apertured, a first pivot means swingably connecting the first leg section of each supporting stand for both lateral swinging and generally fore-and-aft rocking in the associated one bracket member, the other bracket member of each pair of bracket members having a generally vertical slot, a second pivot means disposed in each of said slots and swingably connecting the other leg section of the associated supporting stand for both lateral swinging and generally vertical movement relative to the associated bracket member, the latter having a pair of upper and lower notches disposed generally in vertical alignment with the vertical slot therein, a projection on each second leg adjacent the associated second pivot means and spaced so as to enter either of the associated notches when the associated stand is rocked in a generally vertical plane passing through the associated first pivot means and extending normal to the direction of lateral swinging of the supporting stand about said first and second pivot means as an axis, and spring means anchored to each of said other brackets adjacent the vertical slot therein and connected with the associated second leg section for holding the projection thereon in either of said notches, said spring having sufficient strength to hold the second leg section of the stand in an upper position and against the action of gravity so as to retain the stand locked in its lower position while the implement is being lowered toward the ground.

References Cited in the file of this patent

UNITED STATES PATENTS

| | | |
|---|---|---|
| 354,262 | Sprunger | Dec. 14, 1886 |
| 1,104,696 | Moline | July 21, 1914 |
| 1,822,920 | Burman | Sept. 15, 1931 |
| 1,844,130 | Larsen | Feb. 9, 1932 |
| 2,626,579 | Shaw | Jan. 27, 1953 |
| 2,708,146 | Adler | May 10, 1955 |

FOREIGN PATENTS

| | | |
|---|---|---|
| 422,630 | France | Jan. 24, 1911 |
| 375,089 | Great Britain | June 23, 1932 |